June 20, 1933.   H. A. JUDGE   1,914,972
SELF SETTING ANIMAL TRAP
Filed Sept. 10, 1931
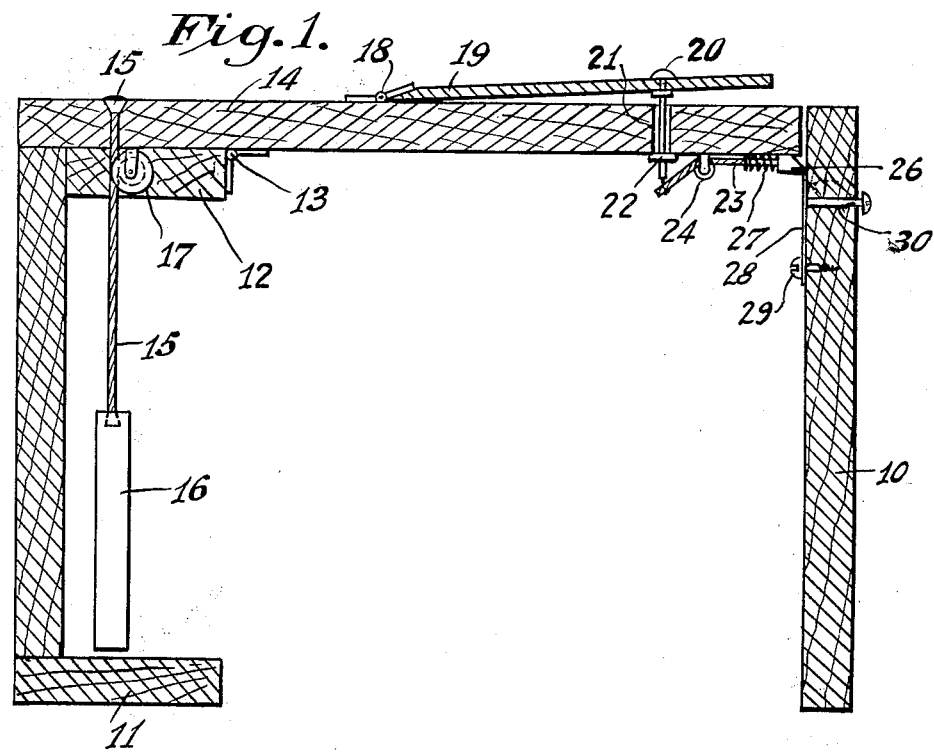
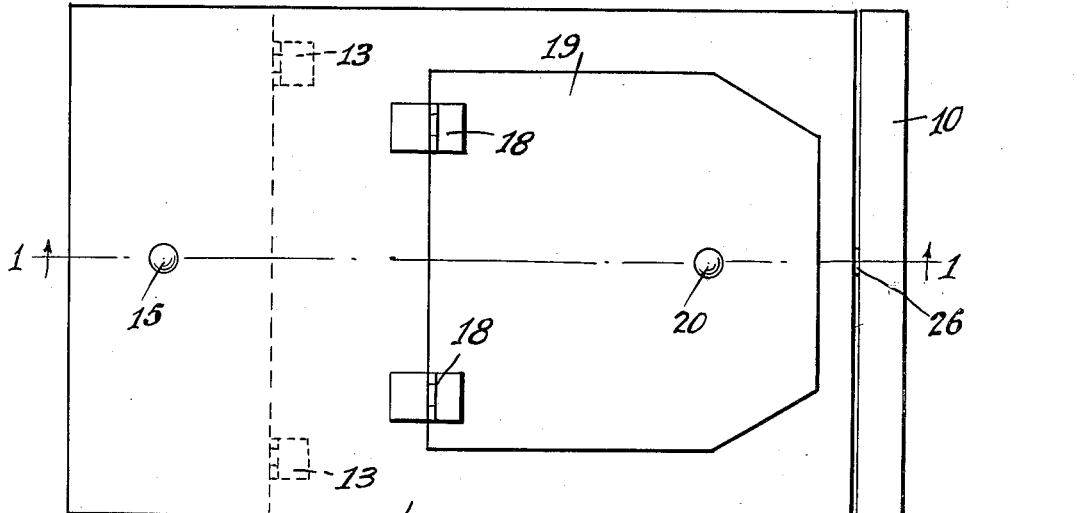
Henry A. Judge INVENTOR Patented June 20, 1933

1,914,972

UNITED STATES PATENT OFFICE

HENRY A. JUDGE, OF NEW YORK, N. Y.

SELF-SETTING ANIMAL TRAP

Application filed September 10, 1931. Serial No. 562,017.

This invention relates to devices for entrapping animals, large or small, according to the proportionate size of the trap structure.

The main object of the invention is to provide a trap which is self-setting, therefore requiring no attention except proper placement and the usual provision of a bait or lure.

A further feature is in the provision of a simple, inexpensive trap, easily constructed and which is not readily liable to accidental disarrangement.

These objects are attained by the novel construction and arrangement of parts hereinafter described and shown in the accompanying drawing, forming a material part of this disclosure, and in which:—

Figure 1 is a vertical sectional view of an embodiment of the invention, the section being taken on line 1—1 of Fig. 2.

Figure 2 is a top plan view of the same.

The trap consists of a four walled, boxlike casing 10, preferably rectangular, provided with a full or partial bottom 11 and a rigid transverse cross bar or partial cover 12.

Connected to the inner edge of the bar 12, by hinges 13, is a plate cover 14 held normally in a raised position, level with the top of the casing by means of a flexible cord 15 passing through the bar 12 and engaging at its lower end with a weight 16.

The cord 15 is arranged rearwardly of the axis of the hinges 13 and is trained to move freely over a pulley 17 set in the bar 12, and the counter weight 16 is adapted to balance the cover 14.

At points forwardly of the hinge 13, on top of the cover, are other hinges 18 by which is attached a thin trigger plate 19 its forward edge reaching nearly to the front edge of the hinged cover.

Fixed centrally in the trigger plate is a rigid plunger rod 20, extending downwardly through an opening 21 in the cover 14, a stop 22 being provided to limit raising of the plate.

The lower end of the plunger 20 is engaged with a flexible connection 23 trained over a pulley 24 revoluble in a bracket set in the under side of the cover, and thence continues to a bevelled latch 26.

Encircling the connection 23 is a light compression spring 27, its rear end being fixed in the cover while its front end abuts the latch 26, pressing it forwardly to engage over the extreme upper edge of a thin spring catch 28 fixed on the inner side of the front wall of the casing by a screw 29 or like fastening.

The catch 28 is adjusted inwardly by an adjusting screw 30, the head of which is accessible from the exterior of the casing.

In operation, an animal, attracted by a suitable bait, may pass over the upper surface of the cover 14, at that time firmly supported by the latch resting on the catch 28.

Upon stepping on the trigger plate 19, the same will be depressed, forcing the plunger 20 downwardly, stressing the connection 23 and withdrawing the latch bolt 26 from the catch, permitting the entire cover to tilt on the hinges 13 and drop the animal into the casing.

Immediately the weight of the animal is removed from the cover, the counter weight 16 restores the parts to their initial position, thus resetting the trap.

Although the improvement has been described with considerable detail and with respect to a certain form of the invention, it is not desired to be limited to such details, since many modifications may be resorted to without departing from the spirit and scope of the invention in its broadest aspect.

Having thus described the invention, what is claimed as new and desired to secure by Letters Patent, is:—

An animal trap comprising a casing, a cover therefor having a hole at one end, means pivotally connecting said cover to the casing, a bevelled latch movably mounted on the underside of said cover, a spring support mounted on said casing and adapted to engage said latch to support the cover in a raised position, a plate, means for pivotally mounting said plate on said cover, a plunger mounted on the underside of said plate and extending through the hole in said cover, means on said plunger to limit its movement, a pulley mounted on the lower side of said cover adjacent said hole, a flexible connection connecting the inner end of the plunger to the latch whereby depressing of the plate disengages said latch and allows the cover to swing downward, means to restore said cover to latched position, and means carried by the casing for adjusting the latch support thereby regulating the sensitivity of the aforementioned latch.

HENRY A. JUDGE.